Jan. 6, 1931.  J. GÉRIN  1,787,517
AIRPLANE HAVING A VARIABLE LIFTING SURFACE
Filed Nov. 30, 1928  8 Sheets-Sheet 1
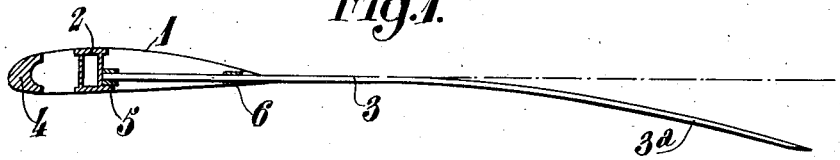
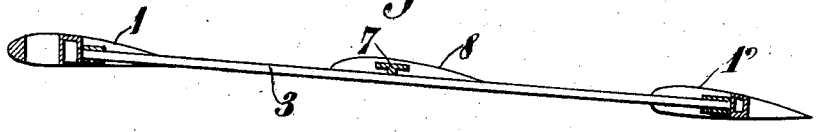
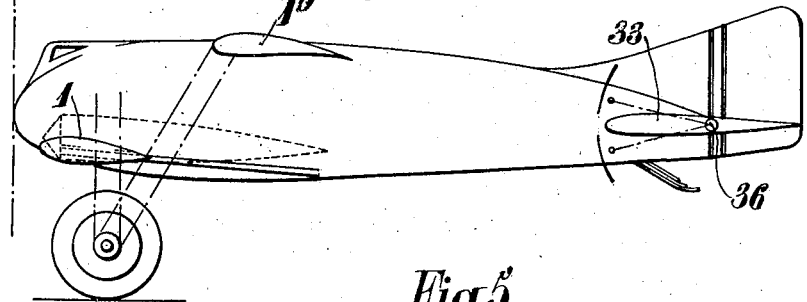
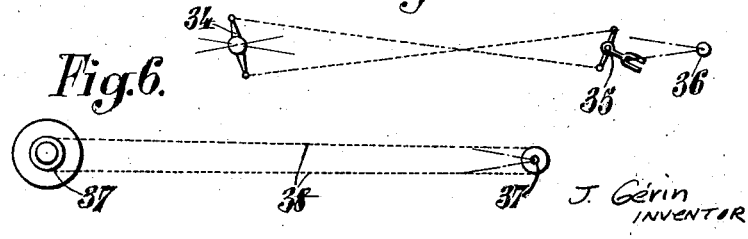

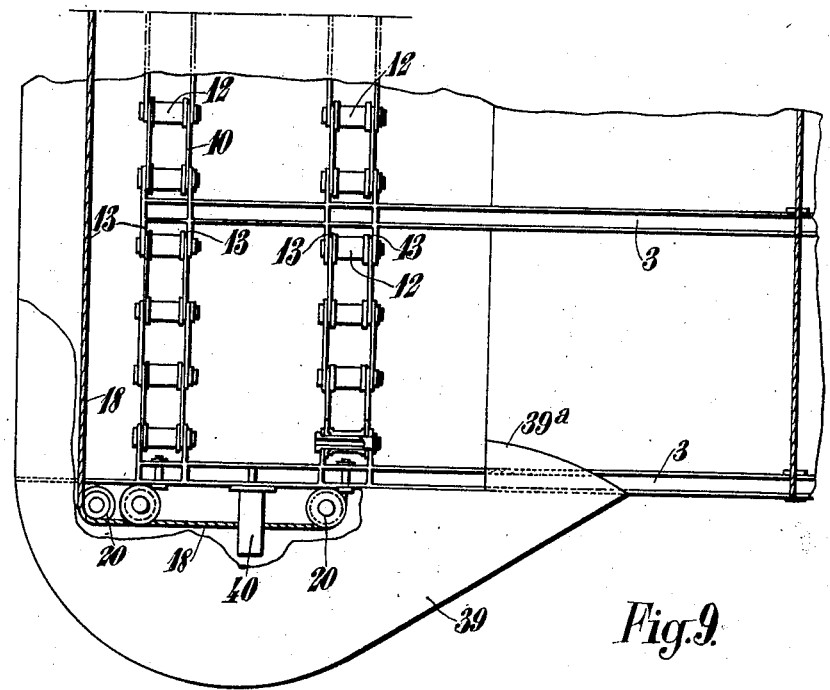
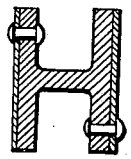
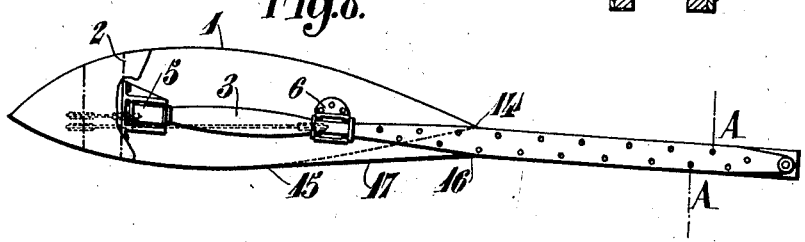

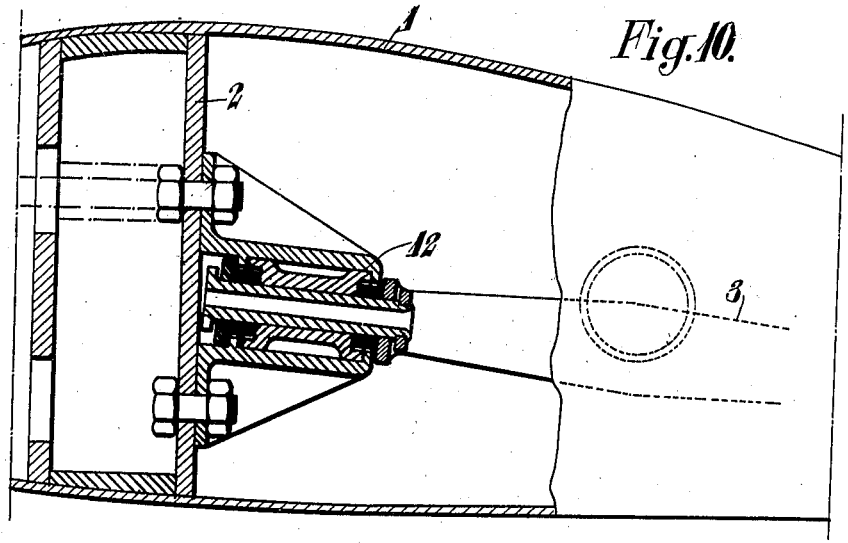
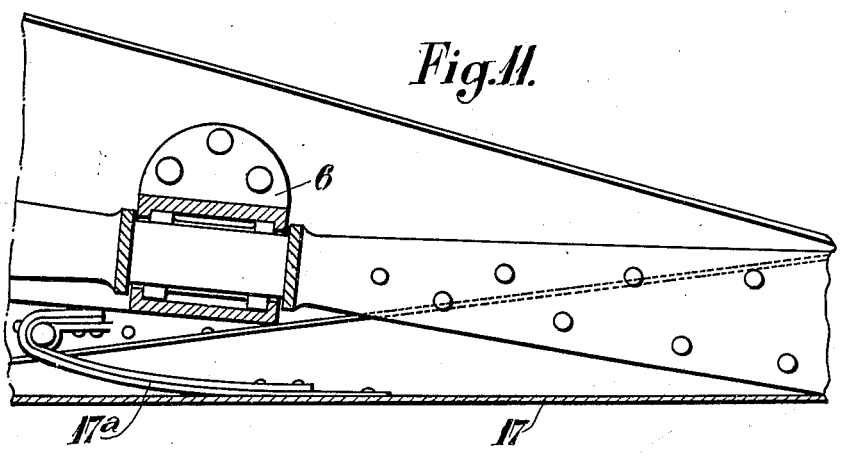
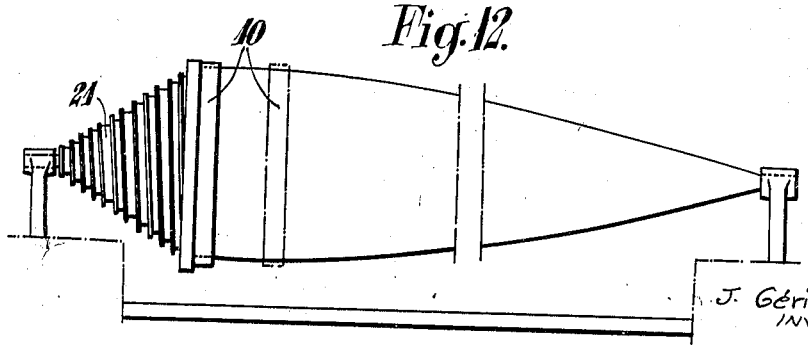

Jan. 6, 1931.                    J. GÉRIN                    1,787,517
                AIRPLANE HAVING A VARIABLE LIFTING SURFACE
                    Filed Nov. 30, 1928        8 Sheets-Sheet 4

J. Gérin, INVENTOR

By: Marks & Clerk
        Attys.

Jan. 6, 1931.  J. GÉRIN  1,787,517
AIRPLANE HAVING A VARIABLE LIFTING SURFACE
Filed Nov. 30, 1928   8 Sheets-Sheet 5

J. Gérin
INVENTOR

By: Marks & Clerk
ATTYS.

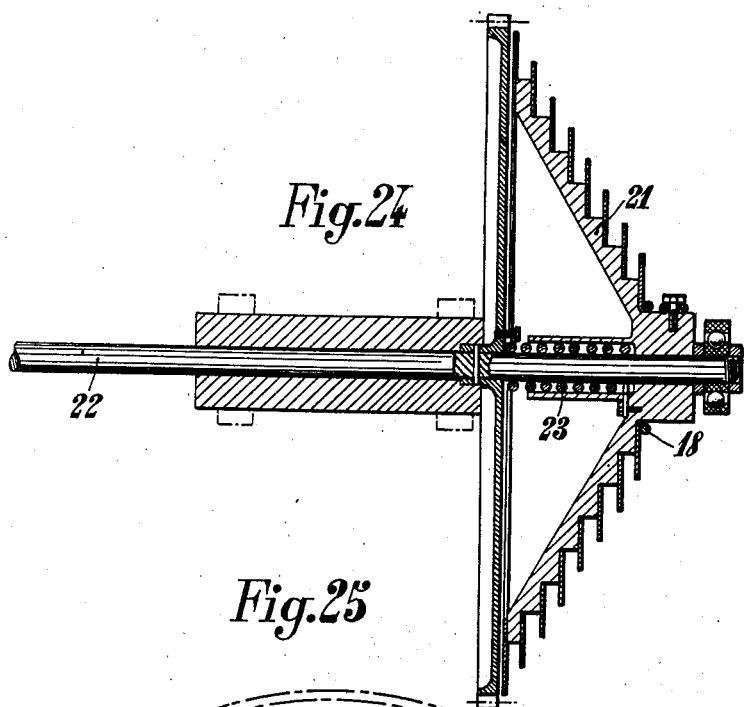
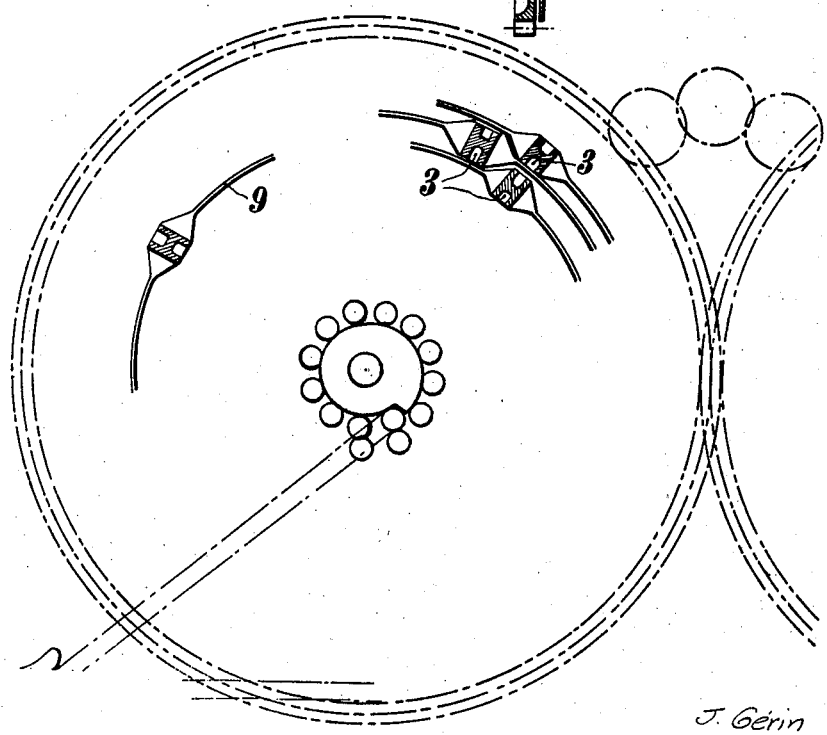

Jan. 6, 1931.  J. GÉRIN  1,787,517
AIRPLANE HAVING A VARIABLE LIFTING SURFACE
Filed Nov. 30, 1928   8 Sheets-Sheet 7

Patented Jan. 6, 1931

1,787,517

UNITED STATES PATENT OFFICE

JACQUES GÉRIN, OF PARIS, FRANCE

AIRPLANE HAVING A VARIABLE LIFTING SURFACE

Application filed November 30, 1928, Serial No. 322,941, and in France December 13, 1927.

The present invention relates to airplanes having a variable lifting surface and relates to a type of variable wing surface applicable to these airplanes and allowing, during flight, to modify, at will, the surfaces of the wings of an airplane in view of obtaining the maximum difference between the speeds during flight and the speeds upon landing, and at the same time to facilitate the flying off of heavily loaded machines.

This variable surface is characterized in that it is constituted by a supple wall reinforced by ribs arranged in the direction of its depth and transversely secured to distortable bonds, such as chains having jointed links which wind on the one hand on an operating drum and, on the other hand, can move in slides arranged on fixed parts of the airplane, those fixed parts being, preferably, lifting surfaces of the airplane.

A form of construction of a variable surface such as above set forth and which, for the moment, seems to present numerous advantages, is characterized, moreover, in that the axis of its winding drum is arranged at right angles to the direction of development of this surface, and to the guide slides of the chains secured on some of the fixed lifting planes of the airplane, an airplane having several movable surfaces the displacements of which are associated, so as to preserve the balancing conditions of the airplane, whatever may be its lifting surface.

The transverse balancing of the airplane is always automatically ensured, if the variable surfaces are arranged in symmetrical groups relatively to the axis of advance of the machine, these groups being controlled per pair from one and the same mechanism.

The balancing in the longitudinal direction can be obtained by the movable surfaces alone or with the adjunction of movable plane provided, preferably, adjacent to the empennage, and the incidence of which is modified by an operating mechanism which preferably is kinematically connected to the control of the movable or variable surfaces.

The accompanying drawing illustrates, by way of example only, various forms of construction of the movable variable surfaces above characterized in their general arrangement.

Figures 1 to 3 are transverse sections of an airplane wing provided with variable surfaces.

Figure 4 is a diagrammatic elevation of an airplane in its entirety, provided with variable surfaces.

Figures 5 and 6 are diagrammatic views of control devices relating to this airplane.

Figure 7 is a plan view of a wing tip.

Figure 8 is a corresponding end view, with part broken away.

Figure 9 is, on an enlarged scale, a cross section according to A—A of Fig. 8.

Figure 10 is a cross section, on an enlarged scale, of a front slide for guiding the chains of the variable surfaces.

Figure 11 is a similar view of a front slide.

Figure 12 is an elevation of a movable surface, wound on its operating drum.

Figure 24 is an axial section of an end of a drum for winding up a movable surface.

Figure 25 is a diagram showing in end view the winding of a movable surface on its drum.

Figure 13:
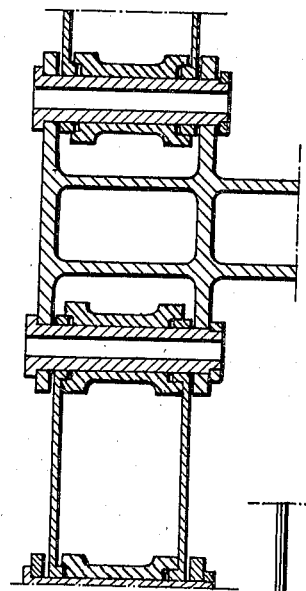
Figure 13 shows, in partial section, a front chain of movable surface, Figure 14 being a corresponding side view.
Figure 14:
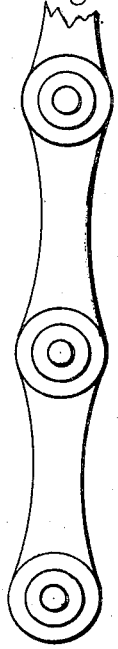

As indicated in the foregoing, an airplane, provided with variable surfaces in accordance with the invention, has, according to its type, a number of fixed lifting planes. With each of these fixed planes, or with some of them only, are combined the variable surfaces which can be either withdrawn within cavities sheltered from the contact of the relative wind of the airplane, or extended for increasing, at will, the lift per unit of area of the airplane.

The fixed planes with which are combined the movable surfaces, are provided with slides arranged in the direction of the span of the airplane and intended to guide chains, formed of jointed links, which connect transverse ribs adapted to reinforce the movable surfaces when they are extended. Thus, in Fig. 1, is shown in section a fixed plane 1, having a spar 2, of any suitable construction, and a leading edge 4 which, preferably, contributes to the resistance of the plane. The portion of the wing, at the rear of the spar 2, is hollow and throughout its length extend slides 5 and 6 between which can move ribs 3 which extend throughout the depth of the variable surface and are suitably distributed throughout the length of the latter. In Fig. 2, the ribs 3 of the variable movable surface move, at their two ends, between two groups of slides 5 and 6 belonging to two fixed planes 1 and 1'. This arrangement is more particularly used in case the variable surface is of great depth.

In case of a very important length of its cord, the variable surface can be sustained by a control slide 7 provided in a lifting plane 8 situated between the two above mentioned planes 1 and 1', as shown in Fig. 3.

Figure 15:
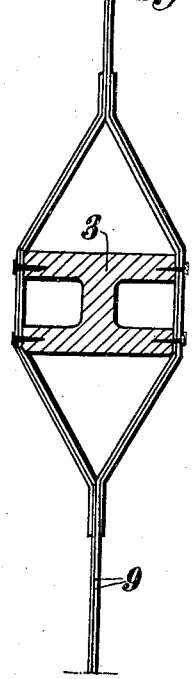
Figure 15 is a partial longitudinal section of a movable surface at the level of a rib.
Figure 16:
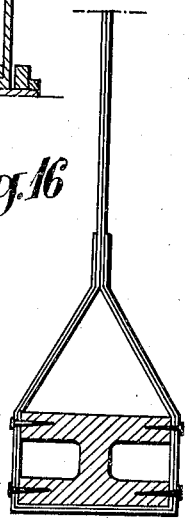
Figure 16 is a similar view of an end rib.
Figure 17:
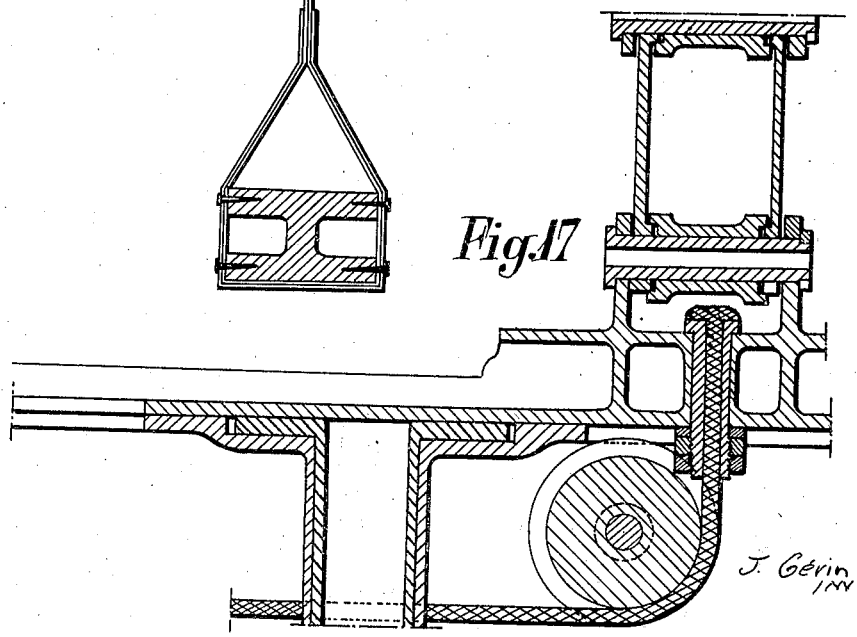
Figure 17 is a horizontal section of a rear chain of movable surface and of its pulling device.
Figure 18:
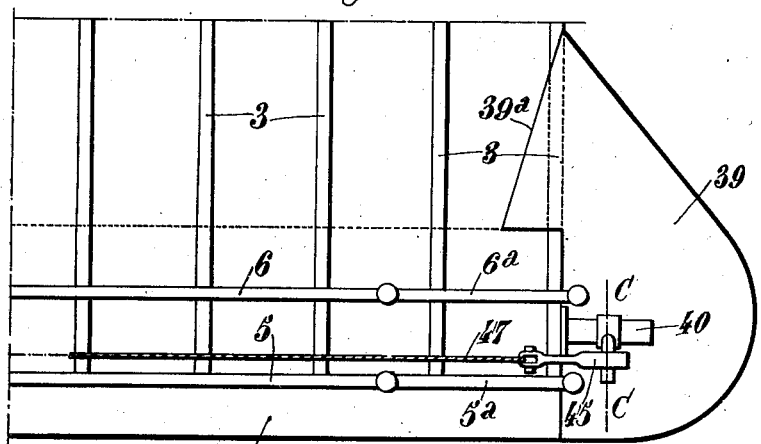
Figure 18 is a plan view of a wing end with movable surface and warping air flap.
Figures 19, 20:
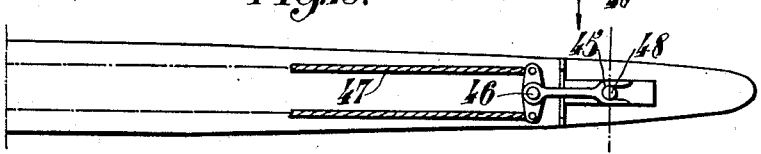
Figure 19 is a corresponding elevation.
Figure 20 is a side view of the mechanism for controlling the wing flap.
Figure 21:
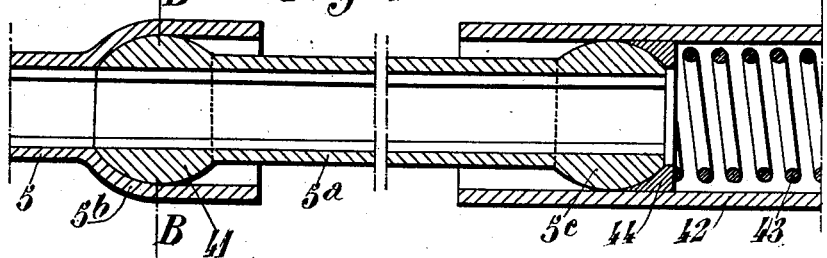
Figure 21 is an axial section of a slide end of the wing of Fig. 18.
Figures 22, 23:
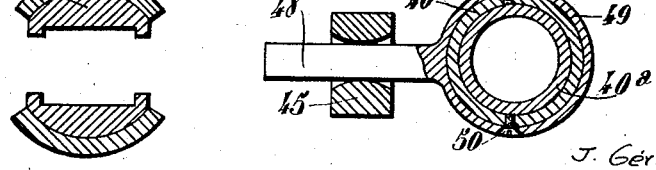
Figure 22 is a cross section according to B—B of Fig. 21.
Figure 23 is, on an enlarged scale, a section according to C—C of Fig. 18.

In the example of construction of Fig. 1, the ribs 3 are so devised as to be rigid on a portion of their length, but as to be able of resiliently distorting at their portion 3ª. These ribs are wrapped up and suitably secured, by gluing or other means, between layers of canvas or other supple walls 9, as shown in Fig. 15.

In Fig. 7, it will be seen that the ribs 3 are secured, at their front part, on two chains 10 and 11 composed of links pivoted about junction axes 12. The ribs are, for that purpose, provided with cheeks 13 which fit between two consecutive links of the chains and are pivoted on the axes 12 of the said links. The links of the chains are guided in the above mentioned slides 5 and 6 and which are illustrated in detail in Fig. 8. The slides 5 are constituted by suitable section members rigidly secured on the spar 2, whilst the slides 6 are, preferably, connected from place to place by rigid cross members, or otherwise, to the spar 2. The junction axes 12 acting as rollers bear laterally on the section members of the slides, so as to hold the movable surfaces transversely to the fixed planes, along which they unfold (Fig. 10). The variable surface slides between the fixed trailing edge 14 of the plane 1 and a trailing edge 16 of a movable surface 17 pivoted at 15 on the plane 1 and, preferably, returned to withdrawal position by springs 17ª (Fig. 11) when the variable surface is not extended. At one of its ends, the movable surface with its chains 11, its ribs 3, and its canvas layers 9, winds on a drum arranged in a recess sheltered from the relative wind of the airplane. One of these drums is shown, in its general aspect in Fig. 12, the variable surface being shown completely wound up.

At the free ends of the chains are attached cables 18 which pass on pulleys 20 suitably supported relatively to the fixed plane 1, these cables winding on a grooved pulley 21 arranged on the driving shaft 22 of the winding drum, but angularly connected to the same, through the medium of a torsion spring 23 the function of which is to ensure a permanent tension of the cables (Fig. 24). The groove for winding up the cables 18 on the pulley 21 is projected in spiral form on a plane at right angles to the axis 22, so that, when the movable surface winds on its drum or unwinds from the latter, the linear speeds of translation of this surface and of the pulling cables are substantially equal.

Figure 26:
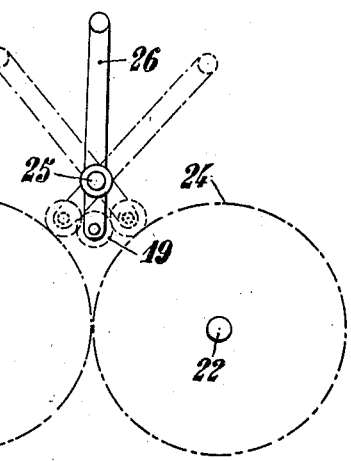
Figure 26 is a diagrammatic view of a mechanism for controlling two associated drums.

As shown in Fig. 25, when the movable surface winds on its drum, the ribs 3 are juxtaposed or superposed according to the zone wound up, so as to reduce the cumbersomeness to the minimum. For allowing an exact superposition of the ribs, it is possible, at the places where it is necessary, to replace one and the same rib by two spaced ribs, the moment of inertia of which corresponds to that of a single rib. The unfolding or folding up of the movable surfaces takes place by causing to rotate, by means of any suitable driving mechanism, its drum in one direction or the other. For ensuring the transverse balancing of the airplane, the movable surfaces are, as already indicated, distributed in groups of two surfaces symmetrically arranged relatively to the axis of advance of the machine and simultaneously moved at the same speed. For that purpose, the driving drums of both surfaces are angularly connected and controlled from one and the same power means. Thus, as shown in Fig. 26, on the axes 22 of two drums are rigidly secured equal pinions 24 constantly gearing together and with which can be put in engagement a driving pinion 19 rigidly secured on the shaft of an electric motor mounted on a frame rocking about an axis 25.

By acting on a lever 26, the pinion 19 is brought in contact with one or the other of the pinions 24 for obtaining the winding up or the unfolding of the variable surfaces. The intermediate position of the pinion 19 corresponds to the condition of rest of the drums. Obviously it is possible to drive the drums by any other mechanism and, for instance, by means of an intermediary provided with a clutch adapted to throw it in engagement or not with a suitable rotating part of one of the engines propelling the airplane. Use can also be made of a control set in action by the muscular force of the pilot or of a passenger.

Figure 27:
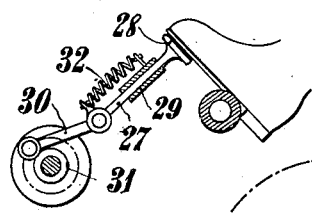
Figure 27 is a foot control mechanism of the winding up drums.

The drums for winding up the flexible surfaces may be rotated from a member upon which is exerted a muscular action from the pilot of the airplane. In Fig. 27, is shown a sliding member 27 guided in a slide 29 secured on a fixed part of the airplane and retracted by one or more springs 32. The sliding member 27 is connected by a connecting rod 30 to a crank plate 31 which, by means of any suitable gearing, drives the drum. The pilot, with its foot bearing upon the parts 28 of the sliding member 27, imparts to the same a reciprocating movement in order to rotate the crank-plate 31.

Figure 4 shows a biplane, having an upper plane 1$^b$ and a lower plane 1, with which is combined a variable surface of the kind of that which has just been described in the foregoing. The drums of the variable surfaces are arranged in the fuselage of the machine and can be driven by a mechanism such as that just described. When the variable surfaces are extended, the conditions of longitudinal balance of the airplane are modified from the fact of the displacements of the centers of thrust.

For correcting these displacements, planes 33 are arranged at the empennage, the incidence of these planes being modified according to the length of unfolding of the surfaces. This modification of the incidence can be effected by means of a special control, or, preferably, by means of a control associated with that of the drums for winding up the variable surfaces. A suitable mechanism can, for instance, be interposed between the control of the drums, and a rocking transmission member 34 (Fig. 5), connected by cables to a lever 35 controlling the axis 36 of movement of the surfaces. This connection can be effected by means of pinions 37 and a chain 38 (Fig. 6).

The warping wing flaps of airplanes provided with the movable surfaces forming the subject matter of the invention are conveniently provided on the fixed lifting planes of the airplane. But when the surfaces are unfolded, the wing flaps, which are sufficient for the speeds of the airplane having a reduced lifting surface, can no longer be sufficient when the lifting surface is increased. In this case, it is necessary to warp a portion of the variable surfaces. For that purpose, use may be made of the arrangement illustrated in Figs. 7 and 18 to 23. At each end of the fixed plane 1 is arranged a wing flap 39 the framework of which comprises a socket 40 mounted on a pivot 40$^a$ rigidly secured on the fixed plane. When the variable surfaces are completely unfolded, the end rib 3 fits between two outwardly extending flanges 39$^a$ of the wing flap 39, so that the oscillations of the latter, about its pivot 40$^a$, are transmitted to the variable surface for warping the end thereof.

For allowing this warping and delimiting its range, the slides 5 and 6 are interrupted before reaching the end of the fixed plane 1 and extended in end parts 5$^a$ and 6$^a$, respectively connected by ball and socket joints to the parts 5 and 6 and to the wing flap 39.

For that purpose, the slide 5, for instance, has, at its end, a box 5$^b$ (Fig. 21) in which fits a spherical member 41 of the part 5$^a$. The latter, at its other end, is provided with a second spherical member 5$^c$ which fits in a sleeve 42 of the wing flap, a spring 43 being interposed between a seat 44 bearing on the spherical member 5$^c$ and a flange or a bottom of the sleeve, for allowing the device to adapt itself to the variations of distance between the sleeve 42 and the slide 5, upon warping. Of course, the chains are made with a sufficient play in their elements for adapting themselves to the transverse torsions imparted to them by the warping.

The actuation of the wing flap is effected by any suitable devices and, for instance, by means of a fork 45, and as illustrated, by means of a fork 45, pivoted at 46 on the fixed plane 1 and actuated by cables 47, in the known manner. The fork 45 engages a finger 48 secured in a lining 49 (Fig. 23) and screws 50, or equivalent means, on the socket 40.

In the foregoing it has been indicated that the drums for winding up the variable surfaces were arranged in recesses or in places sheltered from the relative wind of the airplane. According to the type of the airplane to which these variable surfaces are applied, use may be made of extremely various solutions concerning the places to be reserved for the drums.

Figure 28:
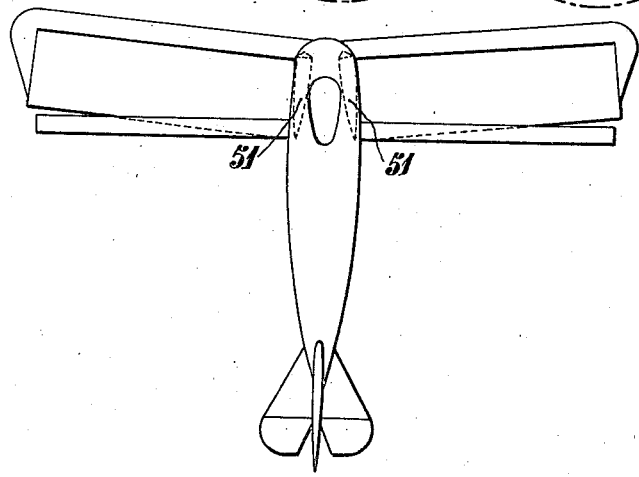
Figures 28 and 29 are diagrammatic plan views of an airplane provided with movable surfaces in accordance with the invention.
Figure 29:
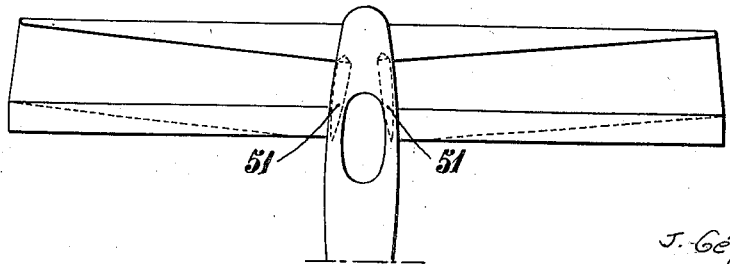

In Figures 28 and 29, which show plan views of biplanes, the drums 51 are arranged in the fuselage, the parts hatched in crossed lines showing these surfaces unfolded.

Figure 31:
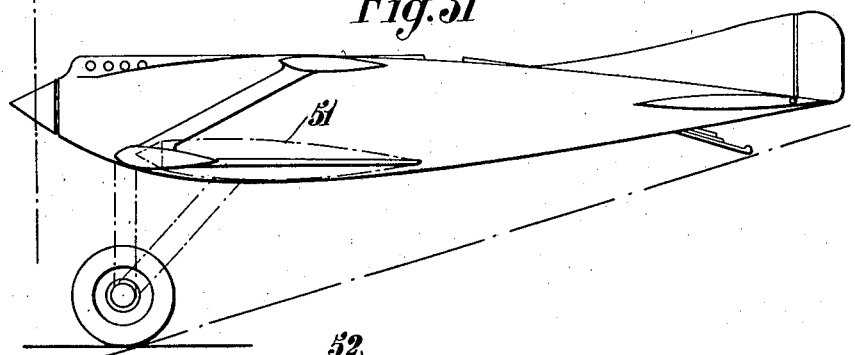
Figure 31 is an elevation of a high speed airplane.
Figure 32:
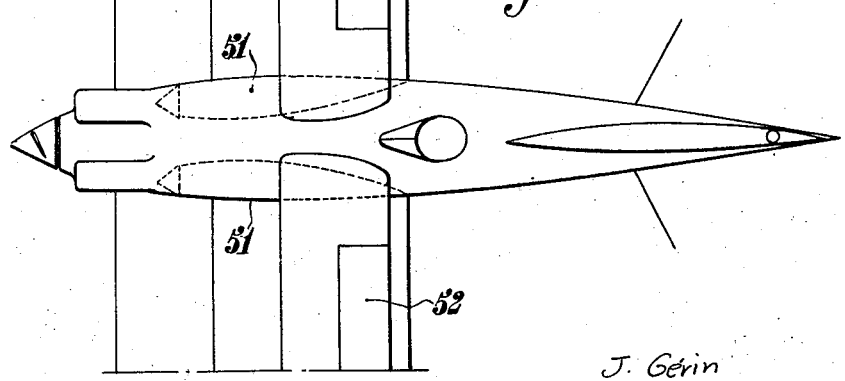
Figure 32 is a corresponding plan view.

In Figures 31 and 32, the arrangement is substantially the same. The fixed upper plane has warping wing flaps 52.

Figure 30:
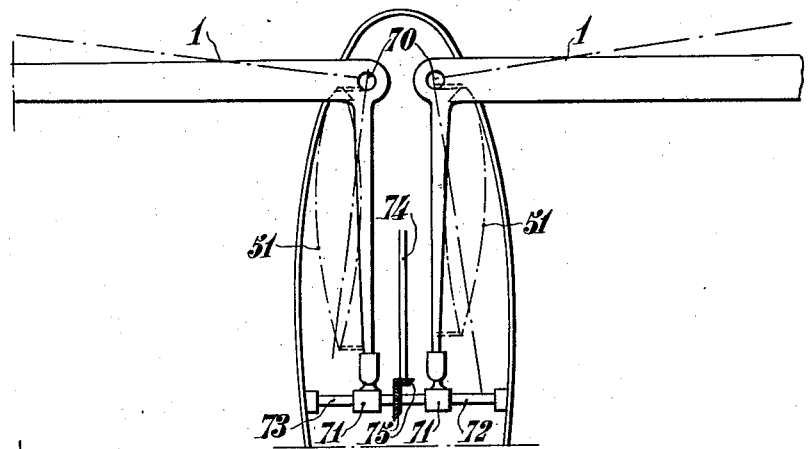
Figure 30 is a diagrammatic plan view of the front part of an airplane, with a lifting plane the V of the leading edges of which is adjustable.

The balancing of the airplane can also be maintained in proportion to the unfolding of the variable surfaces, by modifying the angle of the leading edges of the fixed planes on which are mounted the variable surfaces. For that purpose, use can be made, among other utilizable devices, of the assemblage illustrated in Fig. 30. The lifting planes 1 are pivoted about axes 70 of the fuselage and can pivot about these axes at the same time as the frames carried by the drums 51 of the variable surfaces. These frames are, for instance, attached to nuts 71 mounted on screws 72 and 73 having reverse pitches, simultaneously actuated by a shaft 74 and bevel pinions 75 which can be thrown in gear at will with any suitable engine. It is also possible to modify the position of the centers of thrust in view of maintaining the longitudinal balance of the airplane, whatever may be its lifting surface.

It is also possible by construction (Figs. 28 and 29) to incline the slides of variable planes so that they form a negative sagging, for the purpose of obtaining, by displacement of the center of thrust, the permanent balancing of the airplane.

The invention which mainly concerns variable surfaces of the kind indicated in the foregoing and defined by the above mentioned features, can obviously lend itself, according to the conditions of adaptation, to extremely variable forms of construction. All these constructional modifications, which do not modify the principle of operation nor the object sought for, are obviously included in the scope of the invention.

What I claim as my invention and desire to secure by Letter Patents is:

1. In an airplane having a variable lifting surface, rigid lifting planes, flexible lifting planes comprising a supple wall provided with ribs arranged in the direction of flight of the airplane, drums for winding and unwinding the said flexible planes, means upon the rigid planes for guiding the said ribs when the flexible planes are moved along the rigid planes for varying the lifting surfaces of the airplane, means for operating the drums and for stretching the flexible planes.

2. In an airplane having a variable lifting surface, rigid lifting planes, flexible lifting planes comprising a supple wall reinforced with ribs arranged in the direction of flight of the airplane, chains connecting the said ribs together guiding means upon the rigid planes for the said chains, operating drums for moving the flexible planes and located in closed parts of the airplanes, cables connected to the free end of each flexible plane, guiding pulleys for the said cables upon the rigid planes, a driving pulley provided with a helical groove for the cable and angularly connected to an operating drum in order to stretch the said flexible plane, means for rotating the operating drums.

3. In an airplane having a variable lifting surface, rigid lifting planes or wings, flexible lifting planes comprising a supple wall provided with reinforced ribs arranged in the direction of flight, chains connecting the said ribs together, guiding means upon the rigid planes, for the said chains, operating drums for moving the flexible planes and located in closed parts of the airplane, a cable connected to the free end of each flexible plane, guiding pulleys for the said cable upon the rigid plane, a driving pulley provided with a helical groove for the said cable and angularly connected to an operating drum in order to stretch the said flexible plane, and means for connecting the wing flaps of a rigid wing with the free end of the flexible plane movable along the said wing.

4. In an airplane having a variable lifting surface according to claim 3, a rigid wing having sliding longitudinal girders for guiding the transverse ribs of a flexible plane, balls-joints near the ends of the said sliding members in order to permit distorsions of the latter, a wing flap at the end of the wing, a pivot upon the latter for the said wing flap, and parts on the same to engage the edge of the flexible plane when it is wholly spread out.

5. In an airplane having a variable lifting surface according to claim 1, rigid wing pivoted upon a fuselage of the airplane in order to be moved substantially horizontally, a frame rigidly secured to the said wing and carrying an operating drum for the movable flexible plane guided in sliding members of the wing, means for moving the said wing about its pivot, at the will of the pilot.

In testimony whereof I have signed my name to this specification.

JACQUES GÉRIN.